United States Patent [19]

Macurdy et al.

[11] 4,280,364

[45] Jul. 28, 1981

[54] DEVICE FOR AND METHOD OF MEASURING GLAZING RABBET LOADS

[75] Inventors: William B. Macurdy, Sarver; Albert E. Thompson, Jr., New Kensington, both of Pa.

[73] Assignee: PPG Industries, Inc., Pittsburgh, Pa.

[21] Appl. No.: 79,297

[22] Filed: Sep. 27, 1979

[51] Int. Cl.³ .................................................. G01N 3/08
[52] U.S. Cl. ...................................... 73/818; 73/862.62
[58] Field of Search ............. 73/818, 826, 789, 141 A, 73/432 SD

[56] References Cited

U.S. PATENT DOCUMENTS

| 169,376 | 11/1875 | Scott | 73/826 |
| 2,185,340 | 1/1940 | Howe | 73/826 X |

OTHER PUBLICATIONS

Advertising Brochure, Portable Tension Tester, John Chatillon and Sons, Photo No. 948, Jul. 1954.
Bulletin TA-104 of AMETEK, Hunter Spring Division, entitled Force Measuring Equipment.
Bulletin TA-106 of AMETEK, Hunter Spring Division, entitled Accuforce Digital Force Gage.
Brochure of John Chatillon and Sons, Inc., entitled Chatillon Tension and Compression Testers.

Primary Examiner—Jerry W. Myracle
Attorney, Agent, or Firm—Donald C. Lepiane

[57] ABSTRACT

Force applied to marginal edge portions of a panel by opposed walls of a groove of curtain wall system is measured by mounting a pair of spaced blocks in the groove. Moveable jaw members are mounted in space between the blocks and moved apart into engagement with walls of the groove until the distance between outer surfaces of the jaw members is approximately equal to the width of the blocks. Thereafter, the force applied to the jaw members is measured.

18 Claims, 3 Drawing Figures

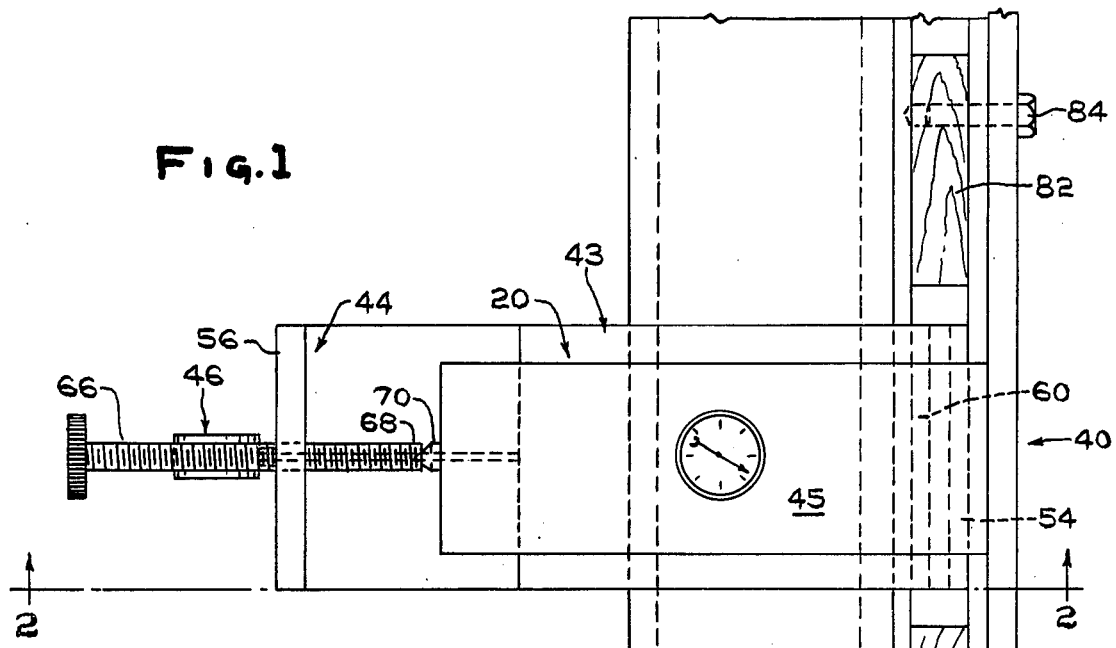
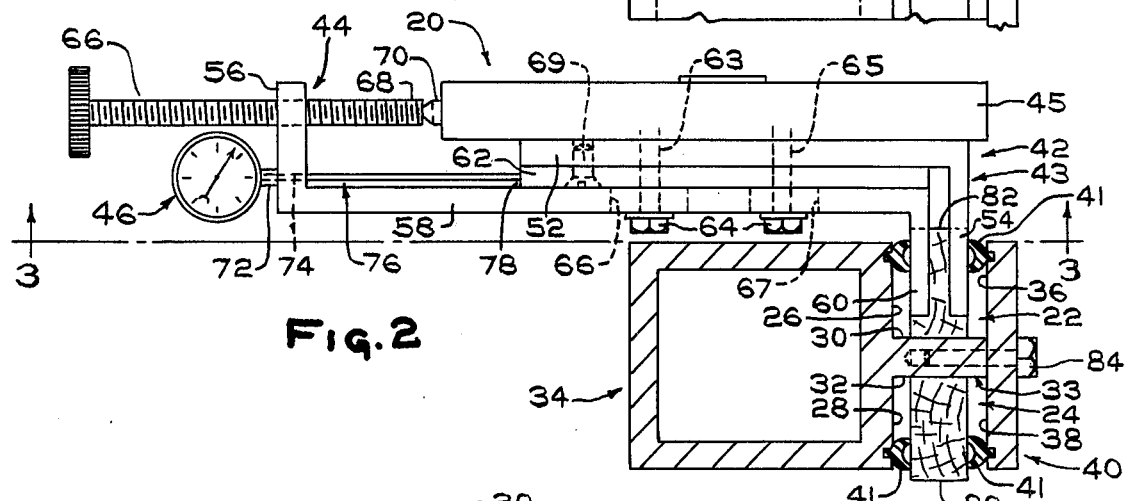
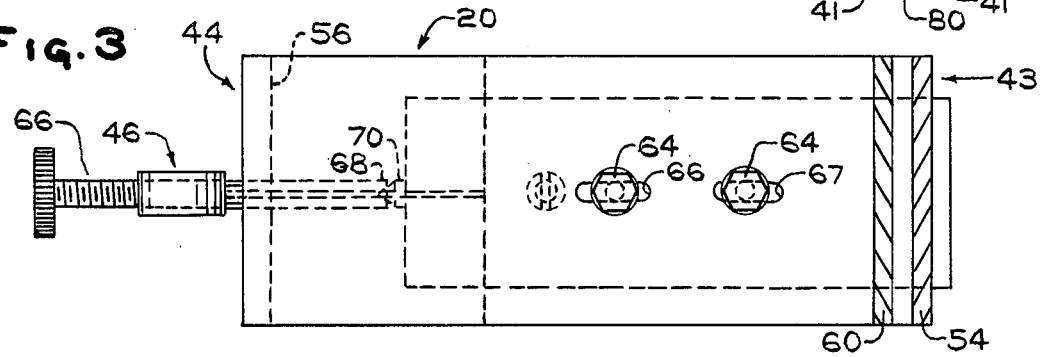

DEVICE FOR AND METHOD OF MEASURING GLAZING RABBET LOADS

BACKGROUND OF THE INVENTION

Field of the Invention

This invention relates to a device for and method of measuring compressive loads.

Discussion of the Technical Problems

Curtain wall systems have vertical members, e.g. mullions interconnected to horizontal members, e.g. transoms to form openings for receiving panels, e.g. spandrels, glass sheets and/or multiple units. The panels are normally secured in position by a face plate secured to the mullions and transoms to apply a compressive force to the marginal edge portions of the panels. In the instance where the panels are made of glass concentrated excessive compressive force can set up stress points that may result in subsequent cracking of the glass. In the instance where the panels are multiple glazed units having a spacer between the glass sheets, the compressive force further contributes to spacer displacement. The compressive force applied to the panels varies as a function of the varying dimensions of the curtain wall system parts, e.g. the mullions, transoms and face plates and therefore, it is not practical to predetermine the compressive force of a preassembled curtain wall system. It would be advantageous therefore, to provide a device for and method of measuring compressive force applied to marginal edge portions of panels by the interaction of the curtain wall system parts prior to securing the panels in position.

SUMMARY OF THE INVENTION

This invention relates to a method of measuring compressive stress of opposed parts biased toward one another, e.g. opposed wall portions of a panel receiving groove of a curtain wall system. A pair of moveable members are mounted in the groove and moved away from each other into engagement with opposed wall portions of the groove until the distance between the outer surface of the members is approximately equal to the distance between wall portions of the groove or thickness of the panel to be mounted therein. Thereafter the compressive force applied to the members is measured.

This invention further relates to a device for carrying out the method of the instant invention and includes a pair of spacers mounted in the groove spaced from one another. The spacers have a width approximately equal to the panel thickness. A pair of jaw members mounted in the groove between the spacers is operatively connected to a displacement gage and force measuring facilities to measure the compressive force of the opposed groove wall portions.

BRIEF DESCRIPTION OF THE DRAWING

FIG. 1 is a plan view of the device of the instant invention for measuring compressive force of a panel receiving groove of a curtain wall system in accordance to the teachings of the invention;

FIG. 2 is a side elevated view of the arrangement shown in FIG. 1; and

FIG. 3 is a view taken along lines 3—3 of FIG. 2.

DETAILED DESCRIPTION OF THE INVENTION

With reference to FIGS. 1–3 there is shown device 20 incorporating features of the invention for measuring compressive force of panel receiving grooves or glazing rabbets 22 and 24 of a curtain wall system. The glazing rabbets 22 and 24 which engage marginal edge portions of panels (not shown) to secure same in position are defined, in general, by outer wall portions 26 and 28 respectively and surface portions 30 and 32 of extension 33, respectively, of mullion or transom 34 and innersurface portion 36 and 38, respectively of face plate 40. Normally weatherstriping 41 is mounted in wall portions 26 and 28 of the mullion 34 and innersurface portion 36 and 38 of the face plate 40 as shown in FIG. 2 to apply the compressive force directly to the marginal edge portions of the panel while preventing or minimizing moisture from collecting in the rabbet. When the term opposed walls of the panel receiving groove or of the glazing rabbet is used herein, reference is made to the wall portions 26, 28, 30 and 32 of the mullion and/or transom and wall portions 36 and 38 of the face plate 40 with or without the weatherstriping 41 mounted in the wall portions 26 and 28 of the mullion and/or transom and/or in the wall portions 36 and 38 of the face plate 40.

Types of curtain wall systems that may be used in the practice of the invention but not limiting thereto are taught in U.S. Pat. Nos. 3,336,707; 3,435,579 and 4,015,388 which teachings are hereby incorporated by reference. The panels (not shown) used in the curtain wall system are not limiting to the invention and may be transparent, opaque, monolithic or multiple panels made of coated or uncoated sheet material such as glass, metal, plastic, wood or combinations thereof. Types of panels that may be used but not limiting thereto are taught in U.S. Pat. Nos. 3,268,316; 3,710,074; 3,791,910; 3,869,198 and 3,935,351 which teachings are hereby incorporated by reference.

With reference to FIGS. 1 and 2, the device 20 of the instant invention includes movable jaw assembly 42 having opposed movable members 43 and 44 for engaging walls of the panel receiving groove 22 or 24, i.e., the engaging position, a force measuring gage 45 (see FIG. 1) to measure the force applied to the jaw assembly when in the engaging position and a gage 46 to measure displacement of the members 43 and 44 relative to one another. With reference to FIG. 2, the jaw member 43 is mounted in any convenient manner to the force measuring gage 45 and the jaw member 44 is mounted in any convenient manner for movement relative to the jaw member 43. The invention is not limited to the materials used in the construction of the device e.g. the jaw members 43 and 44. Preferably, the materials selected should maintain their shape e.g. be rigid and non-deformable under the expected compressive loads in order that the spaced distance between the outer surfaces i.e. engaging surface of the jaw members as measured is the actual spaced distance. Materials that may be used are steel and aluminum. If non-rigid or deformable materials are used, the reading on the gage 46 should be adjusted to compensate for the non-rigidity or deformability of the members. A jaw assembly construction used in the practice of the invention but not limiting thereto includes an angled aluminum member 43 having a width of about 2 inches (5.08 centimeters) and a thickness of about ¼ inch (0.64 centimeter).

Leg 52 of the jaw member 43 secured to the gage 45 in a manner to be discussed below has a length of about 4 inches (10.16 centimeters) and wall engaging leg 54 normal to the leg 52 has a length or depth as viewed in FIG. 2 of about 1⅝ inches (4.13 centimeter). The jaw member 44 may be made by shaping a piece of aluminum having a thickness of about ¼ inch (0.64 centimeter) and a width of about 2 inches (5.08 centimeters) to provide an outer leg 56 having a height of about 2 inches (5.08 centimeters) an intermediate leg 58 normal to the outer leg 56 having a length of about 6 inches (15.24 centimeters) and a wall engaging leg 60 generally parallel to the outer leg 56 and extending in the opposite direction having a depth as viewed in FIG. 2 of about 1⅛ inches (2.86 centimeters).

The intermediate leg 58 of the jaw member 44 and leg 52 of the jaw member 43 are mounted about a bearing 62 and secured to the force measuring gage 45 in a manner discussed below. The bearing 62 reduces friction between legs 52 and 58 of the members 43 and 44 respectively as they move relative to to one another in a manner to be discussed below. The bearing 62 may be a block of a synthetic resin polymer sold under the trademark Teflon having a width of about 2 inches (5.08 centimeters), a thickness of about ¼ inch (0.64 centimeter) and a length of about 4 inches (10.16 centimeter). The block 62 and leg 52 of jaw member 43 each have a pair of 3/16 inch diameter holes 63 and 65 respectively, on a center to center spacing of about 1⅞ inch (4.95 centimeter) and the intermediate leg 58 of the jaw member 44 has a pair of grooves 66 and 67 (see also FIG. 3) each about 3/16 inch (0.48 centimeter) wide, about 1 inch long (2.54 centimeter) and on a center to center spacing of about 1¾ inches (4.95 centimeter) for receiving a screw and washer assembly 64 to the secure the legs 52 and 58 of the jaw members 43 and 44 respectively about bearing 62 to the force measuring gage 45. The washer of the screw and washer assembly is preferably made of low friction material similiar to the bearing 62 for ease of moving the jaw member 43 relative to the jaw member 44.

The force measuring gage 45 is not limiting to the invention and may be any of the type used in the art for measuring compressive force, e.g. an ACCUFORCE digital or mechanical force gage sold by AMETEK, Hunter Spring Division or a CHATILLON tension and compression tester. A gage used in the practice of the invention is a Chatillon compression tester, Model No. DPP-50.

The jaw members 43 and 44 are moved relative to one another by a threaded member 66, e.g. a 5/16-18 screw cap having a length of about 4 inches (10.16 centimeters) having its end 68 countersunk or grooved to match extension 70 of the gage 45. Rotating the screw 66 in a first direction moves the engaging legs 54 and 60 of the jaw members 43 and 44 respectively away from one another into engagement with opposed walls of the rabbet 22 or 24 and rotating the screw 66 in a second opposite direction moves the engaging legs 54 and 60 toward one another away from opposed walls of the rabbet 22 or 24. Displacement of the engaging legs 54 and 60 relative to one another is measured by the gage 46 mounted in the outer leg 56 of the member 44 and secured in position in any convenient manner. Plunger 72 of the gage 46 is joined to end 74 of the rod 76 with end 78 of the rod 76 contacting the bearing 62 or leg 52 of the jaw member 43. The gage 46 is not limiting to the invention and may be any of the types used in the art for measuring displacement, e.g. the type sold by B. C. Ames Company.

The compressive force applied to the marginal edge portions of the panel (not shown) is measured by mounting a spacer 80 of a known width in the rabbet opposite to that being measured, for example, rabbet 24 in FIG. 2 and a pair of spacers 82 in the rabbet being measured, e.g. rabbet 22 in FIG. 2. The spacers 80 and 82 each having the same width are held in position by the screws 84 mounting the face plate 40 on the mullion or transom 34. Preferably the spacers 80 and 82 have the same width as the panel to be mounted in the groove. The surface engaging legs 60 and 54 of the members 43 and 44 respectively, are set in the rabbet between the spacers 82 and the screw 66 rotated in the first direction to move the engaging legs 54 and 60 of the jaw members 43 and 44 respectively apart into engagement with the weatherstriping 41 until the reading on the gage 46 indicates that the distance between outer surface of the engaging legs 54 and 60 is approximately equal to the width of the spacers 82. The reading on the force gage 45 is the expected force acting on the marginal edge portion of the panel by the rabbet. As the jaw members 43 and 44 are moved apart it is recommended that the device 20 be taped to assure that the legs 52 and 58 of the jaw members 43 and 44 respectively are not binding about the bearing. The tapping may be eliminated by providing roll or spherical bearings between the legs 52 and 58.

As can now be appreciated, the above specific examples were presented for illustration purposes only and are not limiting to the invention. For example, compressive force applied by grooves of curtain wall system having only one groove instead of two opposed grooves as shown in FIG. 2 may also be measured by using only spacers 82. Further, the device 20 may be used to measure compressive force applied to marginal edge portions of a panel, e.g. a multiple glazed unit by "C" shaped channels or edge channeling of the type taught in U.S. Pat. No. 3,758,996 which teachings are hereby incorporated by reference. The compressive force may be measured by mounting the engaging legs 54 and 60 into the channel and moving the legs apart to spread the channeling apart until the spaced distance between the surface of the legs 54 and 60 engaging the channeling is about equal to the thickness of the unit. Thereafter the compressive force may be determined from the force gage 45.

What is claimed:

1. A method of determining compressive stress applied by opposed walls having a predetermined spacing comprising the steps of:

mounting between the walls a pair of spacers each having substantially the same width as the predetermined spacing of the opposed walls with adjacent ends of the spacers spaced from one another to provide a measuring position;

mounting a pair of moveable members each having an engaging surface in the measuring position;

moving the members away from each other to move their engaging surface a distance apart approximately equal to the spacing of the opposed walls; and measuring the compressive force acting on the moveable members.

2. The method as set forth in claim 1 wherein opposed walls are walls of a panel receiving groove of a curtain wall system.

3. The method as set forth in claim 2 wherein the groove is a first groove back to back with a second groove and further including the step of:

mounting a spacer in the second groove, the spacer having a width substantially equal to the width of the spacers mounted in the first groove.

4. The method as set forth in claim 3 wherein opposed walls of each groove include outerwall portions of a mullion or transom spaced from innerwall portions of a face plate.

5. The method as set forth in claim 4 wherein said groove is a panel receiving groove and includes a weatherstriping mounted in the wall portions of the mullion or transom and innerwall portions of the face plates and the spacer having a width approximately equal to the thickness of the panel to be mounted in the groove.

6. The method as set forth in claim 4 wherein the face plate is secured in position by screws and the space between the spacers is between a pair of adjacent screws.

7. The method as set forth in claim 1 wherein said measuring step is practiced when distance between outer surface of the movable members in the measuring position is approximately equal to the width of the spacer.

8. A method of measuring compressive force applied to marginal edge portions of a panel by a pair of flexible members, the panel having a predetermined thickness, comprising the steps of:

mounting a pair of moveable members each having an engaging surface between the flexible members;

moving the members away from each other to move their engaging surface a distance apart approximately equal to the predetermined thickness of the panel; and measuring the compressive force acting on the moveable member.

9. The method as set forth in claim 8 wherein the panel is a multiple glazed unit.

10. The method as set forth in claim 9 wherein the flexible members are side members of an edge channeling to be mounted on marginal edge portions of the unit.

11. The method as set forth in claim 8 wherein the members are opposed walls of a panel receiving groove of a curtain wall system.

12. A device for measuring compressive force applied to marginal edge portions of a panel by a pair of spaced elongated members comprising:

a first jaw member comprising:
a leg having a flat planar engaging surface; and
a longitudinal member secured to said leg and extending in a different direction;

a second jaw member comprising:
a leg having a flat planar engaging surface; and
a longitudinal member secured to said leg of said second jaw member and extending in a different direction;

means for mounting said longitudinal members of said first and second jaw members to position said leg of said first and second jaw members opposite one another with said engaging surfaces facing away from one another;

means for moving said first and second jaw members relative to one another to move said legs toward and away from one another;

force measuring means;

means for connecting said force measuring means on said first jaw member to measure the force acting on said engaging surface of said first and second jaw members limiting their moving away from one another; and means for measuring displacement of said legs relative to one another.

13. The device as set forth in claim 12, further including a bearing between said longitudinal member of said first and second jaw members to reduce friction as they move relative to one another.

14. The device as set forth in claim 12 wherein said jaw members are made of a rigid material.

15. The device as set forth in claim 12 wherein said connecting means secures said longitudinal member of said first jaw member to said force measuring means;

said leg of said second jaw member is a first leg secured to a side of said longitudinal member of said second jaw member and said second jaw member further includes a second leg mounted on the opposite side of the said longitudinal member of said second jaw member and extending in a direction opposite to the direction of said first leg;

said measuring displacement means operatively connected to said second leg of said second jaw member and said first jaw member; and said moving means operatively connected to said second leg of said second jaw member and acting on said force measuring means.

16. The device as set forth in claim 13 or 14 or 12 or 15 wherein said longitudinal member and said leg of each of said first and second jaw members are normal to one another.

17. The device as set forth in claim 16 wherein the pair of spaced elongated members include outerwall portions of a mullion or transom spaced from innerwall portions of a face plate.

18. The device as set forth in claim 16 wherein the pair of spaced elongated members are side members of an edge channeling to be mounted on edge portions of a multiple glazed unit.

* * * * *